Jan. 1, 1946.   P. W. MATTHEWS   2,392,251
TRACTOR TREAD DISMANTLER
Filed March 2, 1944    5 Sheets-Sheet 1
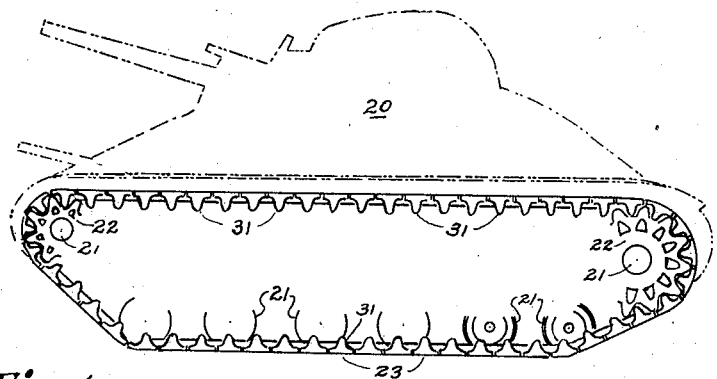
Fig. 1
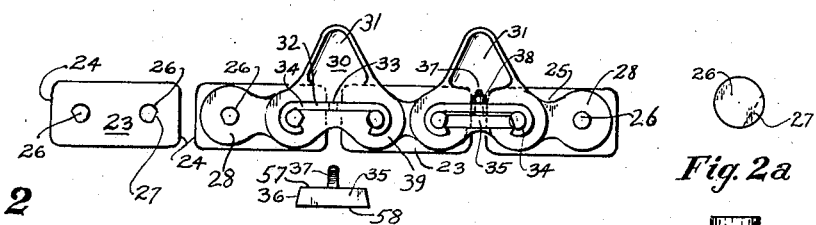
Fig. 2
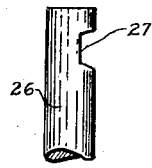
Fig. 2a
Fig. 2b
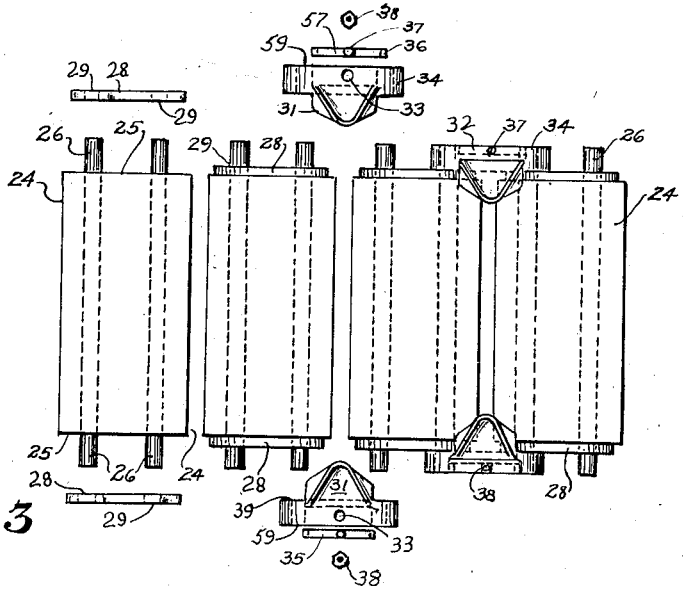
Fig. 3
INVENTOR.
PERCY W. MATTHEWS
BY
Morton S. Brockman Jan. 1, 1946.　　　P. W. MATTHEWS　　　2,392,251
TRACTOR TREAD DISMANTLER
Filed March 2, 1944　　　5 Sheets-Sheet 2
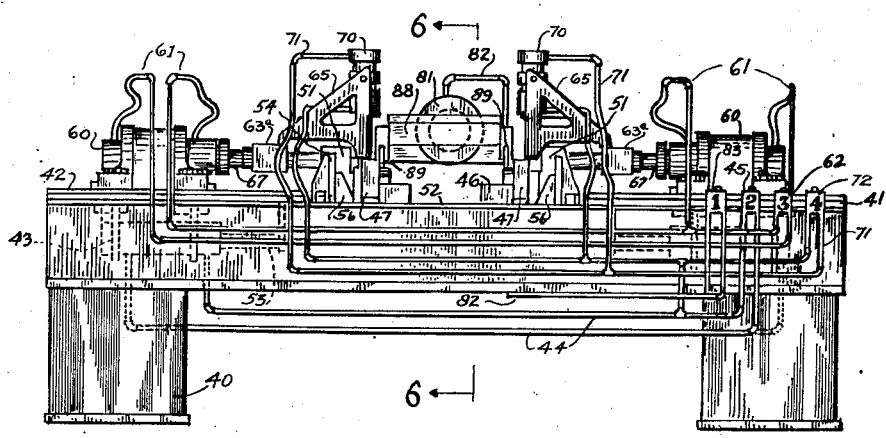
Fig.4
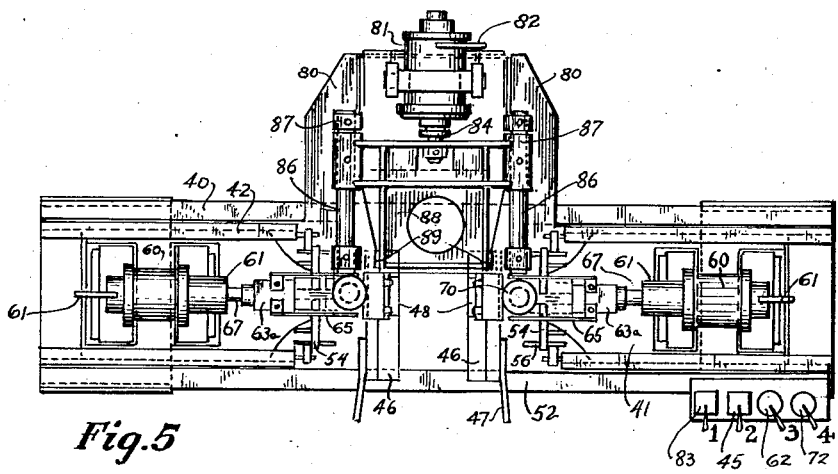
Fig.5
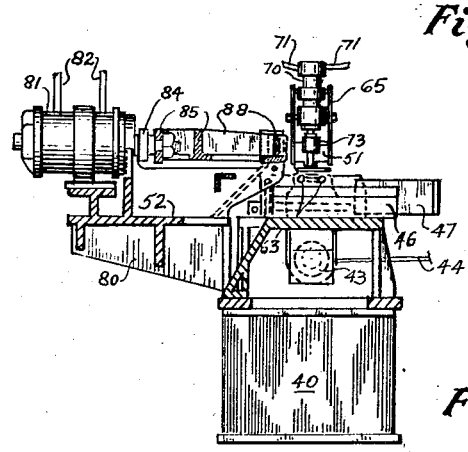
Fig.6
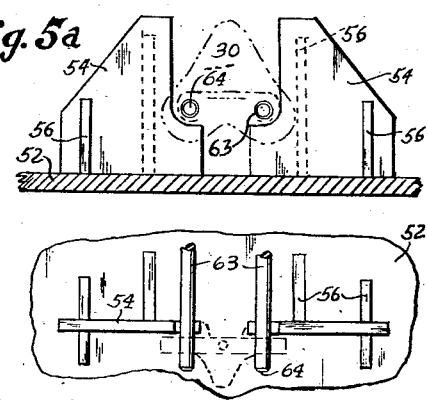
Fig.5a
Fig.5b
INVENTOR.
PERCY W. MATTHEWS
BY
Morton S. Brockman

INVENTOR.
PERCY W. MATTHEWS

Jan. 1, 1946.　　　　P. W. MATTHEWS　　　　2,392,251
TRACTOR TREAD DISMANTLER
Filed March 2, 1944　　　　5 Sheets-Sheet 4

INVENTOR.
PERCY W. MATTHEWS
BY
Morton S. Brockman

INVENTOR.
PERCY W. MATTHEWS.

Patented Jan. 1, 1946

2,392,251

UNITED STATES PATENT OFFICE 2,392,251

TRACTOR TREAD DISMANTLER

Percy W. Matthews, North Kingsville, Ohio, assignor to The Ohio Aircraft Fixture Co., Cleveland, Ohio Application March 2, 1944, Serial No. 524,807

15 Claims. (Cl. 59—7)

This invention relates to tractor tread dismantlers.

For a better understanding and appreciation of this invention, it should be pointed out that certain caterpillar type vehicles have endless-belt or self-laying tracks on each side thereof, which are called treads. These treads are made up of heavy rubber and metal sections linked together and thereby form the two tracks on which the wheels of the vehicle roll. A substantial part of each section is hard rubber and after the tread is worn and discarded a considerable amount of rubber remains which is salvageable and which may be reclaimed.

This valuable rubber, however, is not easy to remove or separate from the adjacent metal parts because: first, the metal is embedded in the moulded rubber; and, second, the metal parts are tightly linked together by mechanical means and are often rusted and wedged together from use. In the past considerable hand labor was used to dismantle a tread and much time was consumed in performing this laborious task.

It is, therefore, the primary object of this invention to provide a machine which will quickly, easily and economically dismantle a tractor tread and separate the sections thereof so that its salvageable materials and parts may more satisfactorily and economically be obtained.

These and other objects of the invention will become apparent from a reading of the following specification and claims, together with the accompanying drawings wherein like parts are referred to and indicated by like reference characters and wherein:

Figure 1 is a comprehensive view of a tractor tread of the type related to this invention as it would appear mounted on a vehicle;

Figure 2 is an enlarged end view of the tread showing various stages of dismantling;

Figure 2a is an end view of a tractor tread section rod;

Figure 2b is a side view of the rod shown in the Figure 2a;

Figure 3 is a plan view of the tread section shown in the Figure 2;

Figure 4 is a front elevation of the dismantling machine constituting this invention;

Figure 5 is a plan view of the same machine;

Figure 5a is an inner side elevation of one of the fixed stripping members of the machine;

Figure 5b is a plan view of the stripping member shown in Figure 5a;

Figure 6 is a vertical cross-sectional view of the machine taken along the line and in the direction of the arrows 6—6 of the Figure 4;

Figure 7:
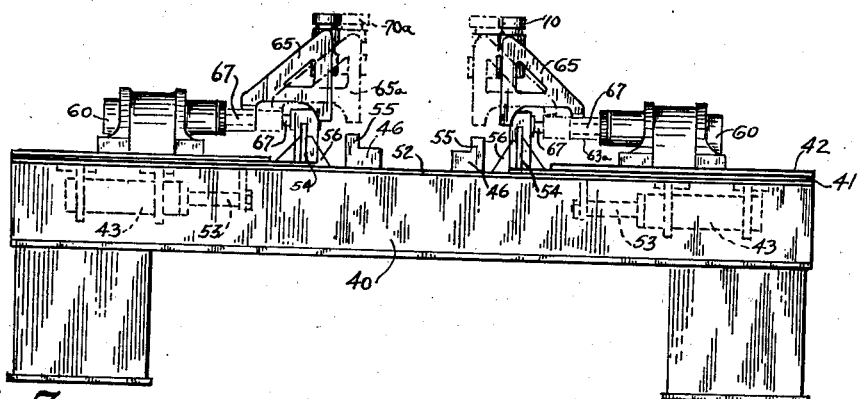
Figure 7 is a front elevation of the essential parts of the machine showing relative positions of the movable stripping member during one stage of its operation and alternate positions thereof.
Figure 8:
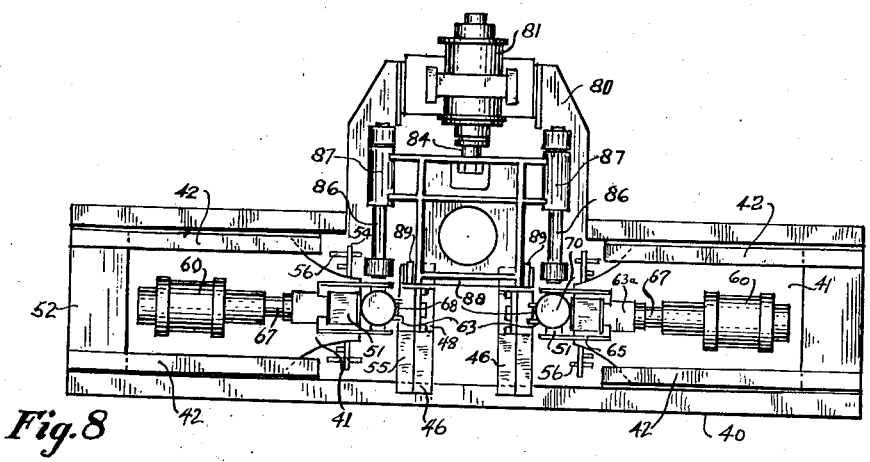
Figure 8 is a plan view of certain parts of the machine during the stage of operation indicated in the Figure 7.
Figure 9:
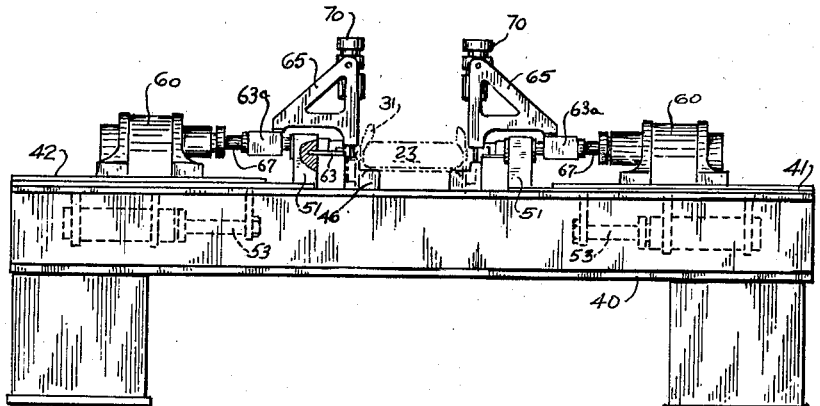
Figure 9 is a front elevation of certain parts of the machine during another stage of its operation and indicating in broken lines the position of the tread being dismantled by the machine.
Figure 10:
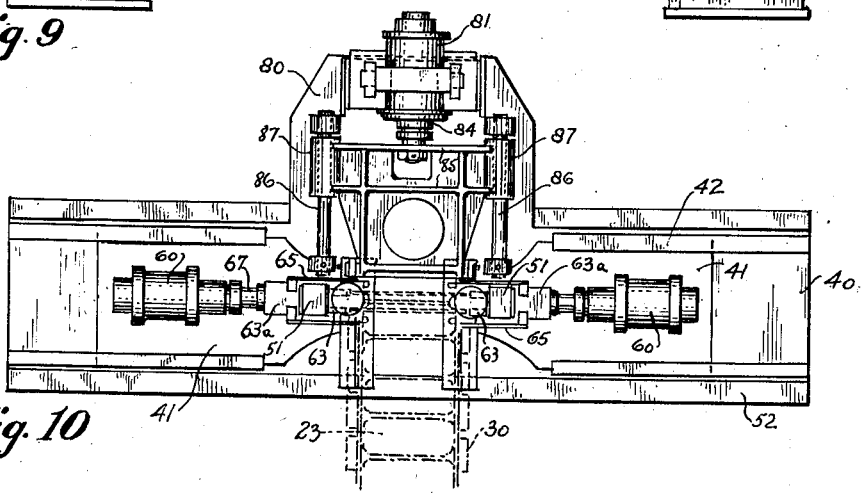
Figure 10 is a plan view of the essential parts of the machine and tread shown in the Figure 9.

The invention broadly consists of a table or support member on which there is a holding member or a track along which the tread moves, a means for securely retaining and positioning tread sections on the track and preventing lateral movement thereon, a means for pulling and removing the links from adjacent tread sections and a means for advancing linked tread sections along the tracks. Each of these parts will be described in detail and in the order just set forth.

However, before describing the machine itself, it may be well to describe the tread sections and links thereof for which it is designed. The endless-belt or tread is composed of sections 23 each of which is a solid block of rubber about fifteen inches long, eight inches wide and approximately five inches thick. Through each rubber block embedded and running lengthwise therein are two parallel rods or bars 26. These extend outwardly about three inches from the ends 25 of the blocks. Small plates 28, each having two spaced holes 29 therein fit tightly against the tread ends 25 and engage the ends of the rods 26 as shown in the Figures 2 and 3. The end plates 28 are slightly narrower than the thickness of the rubber block 23 so that they do not touch the road surface when rolling with the vehicle.

The ends of the rods 26 have key-ways 27 cut therein for the keys 35 which will be hereinafter described. The key-ways 27 on the parallel rods 26 are simply small chordal slots that face each other at an angle and are located between the plates 28 and the rod ends.

The links 30, which connect the sections 23 together to form the tread, are odd-shaped pieces of metal. Each has an apron portion 39 which has two holes 59 therein, and abuts the aforementioned section plate 28. The two holes 59 match the holes 29 and engage adjacent rods 26 of the contiguous sections 23. Extending upward from the apron portion 39 (when the sections are on the ground) are lugs 31, which stand adjacent to the abutting edges 24 of the sections. The lugs 31 engage the wheels 21 of the vehicle and in the aggregate form side guides for the endless tracks, so they do not slip from the wheels.

At about where the lug 31 joins the apron portion 39, there projects laterally a flange portion 32, the ends of which roll downward and form two channels 34 for the ends of the rods 26. In the center of the flange 32 and in line with the key-ways 27 there is a round hole for the hereinafter described key 35.

The key 35 is simply a small quadrilateral plate having parallel top and bottom edges 57 and 58 respectively and inclined or non-parallel ends 36. Extending upward from the short top edge 57, there is a threaded portion 37 which fits in the hole 33 and is held therein by the nut 38. The tapered or inclined edges 36 thereof, fit into the key-ways 27 in the rods 26. By this means, the sections 23 are connected together and the links 30 are retained on the rods 26.

The table or support member, broadly indicated by the character 40, is made of heavy metal, wider than it is long and shaped somewhat like an inverted "T." The two sides have laterally sliding top panels 41 which move inward or outward along the tracks 42 on the stationary table tops 52. On the under side of the tops 52 there are mounted pressure actuated means consisting of two air cylinders 43. The pistons or rams 53 of these two air cylinders 43 are connected to the sliding table tops 41, and these laterally operating air cylinders are positioned so that the rams 53 with the tops 41 move simultaneously in opposite directions. That is, they move toward each other or away from each other. By injecting air into the two cylinders 43 simultaneously by means of the conduits 44 and by the opening of the single valve, No. 2, indicated by the character 45, the sliding table tops 41 move toward the center of the table 40 but do not meet and by ejecting the air, the tops move outward toward the side ends of the table. The rams 53 and any or all of the parts of the machine that they directly move or operate are referred to as the first press members.

In the center of the table and between the two sliding tops or panels 41 and running lengthwise thereof, are a pair of flanged tracks 46, on which a length of tread is placed and along which the connected sections 23 move. The front ends of the tracks 36 are provided with guides 47 for receiving and directing the tread. Near the end of the parallel tracks 46 there are track portions indicated by the character 48 which spread apart. The spreadable track portions 48 are pivoted by pins 49 to the table top 52 and are provided with counterweights 50 which return them to their normal position; the normal position being in line with the fixed tracks. When in the alternate position, the flanges 55 of the spreadable track portions 48 move outward so that the links 30 which are on the track and inside of the flanges, may be slid off the rods 26 laterally without being lifted.

Between each of the laterally sliding table tops or panels 41 and the longitudinally extending tracks 46, proximate to the latter and firmly attached to the stationary tops 52, are mounted certain rigid portions referred to as the fixed stripping means. This means consists of two upright plates 54 strongly supported on both sides by the brackets 56. The plates 54 are spaced and cut away as shown in the Figures 5a and 5b so that the hereinafter described back-up pins 63 may pass through but not the links 30, temporarily mounted thereon. When the pins 63 are drawn outward with the links thereon, the pins freely pass through the plates 54. The links 30 being wider are obstructed by the plates and are thus stripped off the pins.

Figures 11, 12, 13:
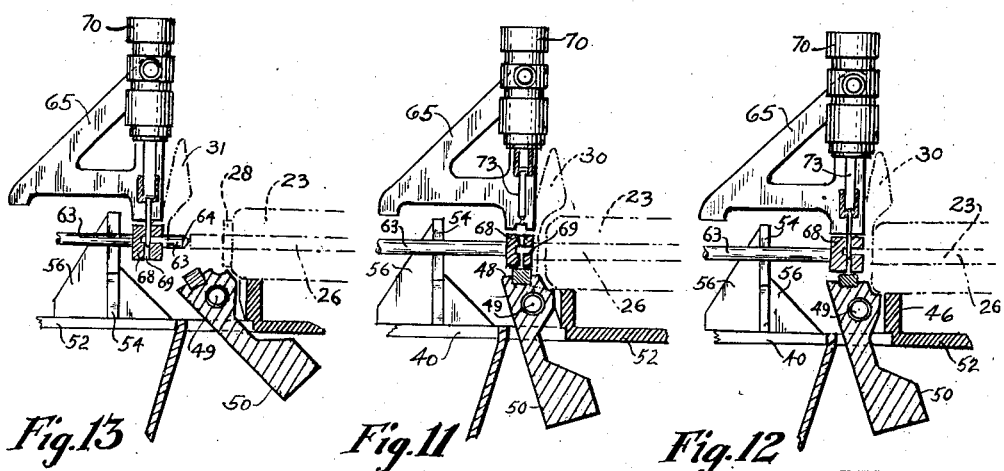
Figure 11 is an enlarged front elevation of the fixed and movable stripping apparatus of the machine showing their relative positions during one stage of operation.
Figure 12 is a view similar to that of Figure 11 but showing another stage of operation.
Figure 13 is a view similar to that of the Figure 11 but showing still another stage of operation.

On each of the slideable table tops 41 there is mounted a substantial support 51 from which there projects toward the tracks 46 the pair of parallel and horizontal back-up pins 63. These pins abut and engage the ends of the rods 26, when the table tops are inward. The pins 63 are of the same diameter or they may even be slightly smaller than the rods 26. The back-up pins have tapered ends 64 and are positioned to abut the rods 26 when tread sections 23 are on the tracks and when the links 30 are properly positioned at the spreadable track portions 48. This permits the links 30 to be slid from the pair of rods 26 on to the back-up pins 63 as clearly indicated by the Figures 11, 12 and 13.

Figure 14:
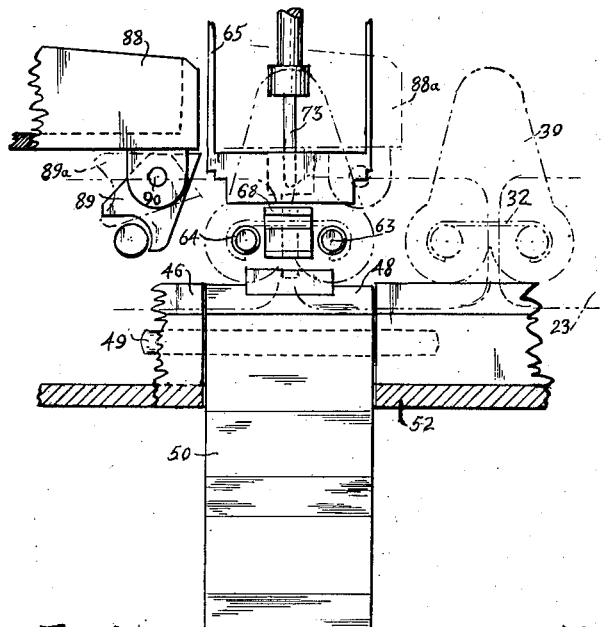
Figure 14 is an enlarged side elevation of parts of the tread positioning members and the jaw-like portions of the movable stripping members of the machine.
Figure 15:
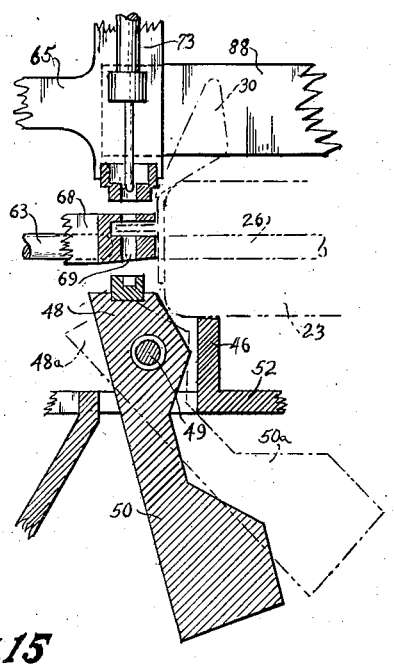
Figure 15 is a front view, partly in section of the jaw-like portions shown in the Figure 14.
Figure 16:
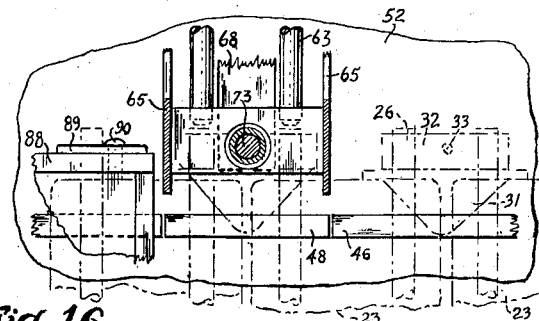
Figure 16 is a plan view of the apparatus shown in Figure 14 and 15.
Figure 15A:
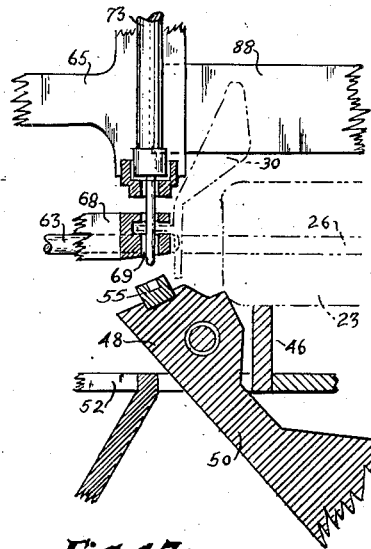
Figure 15a is a view similar to that of Figure 15 but showing parts of the movable stripping members and the jaw-like portions firmly engaging a tread link.
Figure 17:
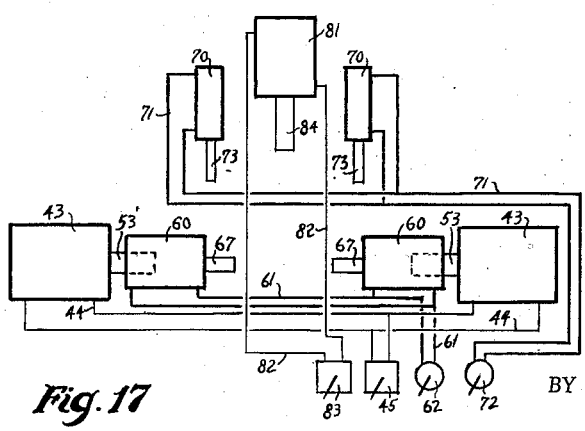
Figure 17 is a schematic illustration of the various air and liquid operating cylinders of the machine and showing their respective conduits and controls.

On each of the sliding tops 41, and substantially in line with the pair of pins 63 there is mounted a horizontal and laterally operating pressure actuated means consisting of a hydraulic cylinder 60. Mounted on each of the blocks 63a which are connected to the rams 67 there are triangular supports or brackets 65 for retaining the hereinafter described vertical cylinders 70. Also attached to the blocks 63a of the rams 67 are certain jaw-like portions 68 which engage the link flanges 32 and which have vertical holes 69 therein for receiving the vertical ram 73 as shown in the Figure 15a. These jaw-like portions 68 on each side of the machine operate between the back-up pins 63 as shown in the Figures 14 and 16.

The two hydraulic cylinders 60 are connected in parallel and operate simultaneously in opposite directions. When a liquid is permitted to enter the two cylinders by way of the conduits 61 and by the manipulation of the valve No. 3, indicated by the character 62, the rams 67 move outward and toward the center of the table or tracks 48. The aforesaid blocks 63a which support the bracket 65 and the jaw-like portions 68 and which are connected to the rams 67 are slidably mounted on the supports 51. The rams 67 and any or all of the parts of the machine that may be directly moved or operated thereby are referred to as the second press members.

On each support 65 there is mounted a vertical hydraulic cylinder 70. These two perpendicularly operating hydraulic cylinders 70 have downwardly projecting rams 73. These are directly over the holes 33 of the links 30 when the sections are on the tracks and the links thereof are located at the spreadable track portions 48; and when the cylinders 43 and 60 are expanded or in the open position. The vertical hydraulic cylinders 70 are connected in parallel by the conduits 71 and are operated by the valve No. 4 which is indicated by the character 72.

When the hydraulic cylinders 70 are fully expanded or opened, their rams 73 descend and project through the vertically aligned holes 69 of the two jaw-like portions 68 and through the holes 33 of the links 30 and thus engage or couple the links 30 with the laterally operable rams 67. The laterally operable rams 53 and 67 together with their associated movable parts are broadly referred to herein as the propeller members. They also are known as the movable stripping means since they act against the heretofore described fixed stripping means or plates 54.

The single longitudinally operating pneumatic cylinder 81 is mounted at the rear of the table 40 and on the shelf portion 80 thereof and in line with the fixed tracks 46 and the spreadable tracks 48. This pneumatic reciprocating means has a ram 84 therein and is also referred to as a pressure actuated feeding and positioning means. The ram 84 moves between two parallel bars 86 and has a cross member 85 attached thereto which has collars 87 slidably mounted on the bars 86. The front piece 88 of the cross member 85 has two pawls or catches 89 pivoted thereon by the pins 90 which engage the two ends of a connecting pin or rod 26 when the cylinder 81 is expanded and when a tread section is on the tracks 46 and the links thereof are properly positioned on the spreadable tracks 48. The cylinder 81 is operated by the valve No. 1, indicated by the reference character 83 and has conduits 82 connected thereto.

Normally, when the machine is not in operation the four valves Nos. 1, 2, 3 and 4 are closed. All the rams 53, 67, 73 and 84 are in their respective cylinders, the slideable panels 41 are outward or spread apart on the table top 52, the spreadable track portions 48 are in line with the adjacent fixed track 46 and the cross member 85 is to the rear of the machine. During operation an end of a length of tread is on the tracks 46 and 48, the nuts 38 and keys 35 of the tread having been first removed therefrom. The tread is laid with the lugs 31 extending upward and with the links 30 of the first two connected sections 23 over the spreadable track portions 48.

The first operation takes place when the valve No. 2 is opened. This causes the movable table tops or sliding panels 41 to move inward with the support 51 and the pressure actuated means or cylinders 60 and 70 thereon. The back-up pins 63 are thus caused to project through the central opening of the fixed stripping means or plates 54. They align with and their tapered ends 64 contact the outer ends of the connecting rods 26 of two contiguous tread sections.

The second operation occurs when the valve No. 3 is opened and the rams 67 of the horizontal cylinders 60 move toward the center of the table. The brackets 65 and the vertical cylinders 70 thereon move toward the center of the table so that the vertical rams 73 come to a stop directly over the holes 33 of the links. The jaw-like portions 68 also engage the link flanges 32.

The third operation takes place when the valve No. 4 is opened and the vertical rams 73 pass through the jaw-like portions 68 and the links 30.

The fourth step occurs when valve No. 3 is closed or reversed. This operation causes the rams 67 together with the jaw-like portions 68 and the cylinders 70 thereon coupled to the links 30 to move outward. The two links 30 are thus drawn or stripped off the rods 26 and on to the back-up pins 63.

The fifth step of the operation is effected by closing and then reversing the valve No. 4. This removes the vertical rams 73 from the jaws 68 and particularly from the holes 33 in the links.

The sixth step of the dismantling operation takes place when valve No. 2 is closed or reversed. The table tops move outward and the back-up pins 63 are drawn out of the link channels 34 while the links 30 are stopped by the fixed stripping means or obstructing plates 54. As soon as the back-up pins 63 are completely withdrawn the links fall to the floor or into a container.

The seventh and final operation occurs when the valve No. 1 is opened. This causes the ram 84 and the cross member 85 attached thereto to move forward. The pawls or catches 89 on the cross member 85 engage the ends of the nearest connecting rod 26 of the first connected tread section. Thereafter valve No. 1 is turned to reverse the movement of the ram 84. The ram 84 by this last operation pulls the cross member 85 and the tread sections forward to proper position for the removal of the next pair of links 30.

The aforesaid steps are repeated in the order stated for each pair of links to be removed.

In the foregoing description, certain cylinders are designated as being pneumatically operable and others hydraulically operable. If all tread sections and links were new and in good condition, any of the cylinders could be either of the pneumatic or the hydraulic type. Either type of cylinder would function and be serviceable, but since old and worn tread members for which this machine is designed often are bent and damaged, it has been found in practice to be more desirable to use pneumatic cylinders where the work is relatively light and to use hydraulic cylinders where greater pressure is occasionally needed.

Specifically, in this disclosure the cylinders 43 and 81 are of the pneumatic type and the cylinders 60 and 70 are hydraulic. The use of pneumatic cylinders here permits a speedier operation of the machine.

The removal of the links 30 from the back-up pins 63 is a relatvely light operation. The drawing of the tread along the tracks 46 for a few inches at a time is also a relatively light operation. On the other hand, the cylinders 60 are frequently required to exert great pressure since the links 30 are often tightly rusted onto the rods 26. Therefore a slower and more careful operation is desired at this stage. Similarly, the cylinders 70 are hydraulic because the flanges 32 of the links are sometimes bent out of shape or damaged so that they do not properly engage the jaw-like portions 68 or the holes 33 therein may not line up with the holes 69. In such cases, it is desirable to have the rams 73 move slower so that the operation may be more easily observed.

It should be understood that the operation of this machine can be made entirely automatic by utilizing solenoid operated valves or other electrical or mechanical controls. Such automatic controls are not in themselves features of this invention and therefore are not illustrated in the drawings. They are, however, well known to persons familiar with the art. Furthermore, while the invention has been disclosed in its preferred form, it is to be understood that the particular embodiments thereof, described and illustrated herein, is not to be considered in a limited sense as there may be other forms or modifications of the invention which might also be considered to come within the scope of the appended claims.

I claim:

1. A tractor tread dismantling machine of the type adaptable for use with tread made of several sections having parallel rods therein and which sections are connected together by links mounted on the ends of adjacent rods of contiguous sections, comprising in combination, a support member, a holding member for two contiguous sections of the aforesaid tread mounted on the support member, first press members mounted on the support member and engageable with the ends of two adjacent rods of the said contiguous sections, and second press members mounted on the support member and engageable with the aforesaid links on the said adjacent rods, the said press members being operable in a manner whereby the links are removed from the rods and the said sections thereof become disconnected.

2. A tractor tread dismantling machine of the type adaptable for use with tread made of several sections having parallel rods therein and which sections are connected together by links mounted on the ends of adjacent rods of contiguous sections, comprising in combination, a support member, a holding member for two connected sections of the aforesaid tread mounted on the support member, and propeller members having independently operated rams engageable with the said sections and with the aforesaid links in a manner whereby the links are removed from the sections and thereby disconnect the same.

3. A tractor tread dismantling machine of the type adaptable for use with tread made of several sections having parallel rods therein and which sections are connected together by links mounted on the ends of adjacent rods of contiguous sections, comprising in combination, a support member, tracks for retaining and guiding the aforesaid tread on the support member, propeller members including means for separating the several sections of the tread mounted on the support member substantially across the said tracks, and a means for moving the tread along the tracks and to the said propeller members.

4. A tractor tread dismantling machine of the type adaptable for use with tread made of several sections having parallel rods therein and which sections are connected together by links mounted on the ends of adjacent rods of contiguous sections, comprising in combination, a support member, tracks for retaining and guiding the aforesaid tread on the support member, propeller members including means for separating the several sections of the tread mounted on the support member athwart the said tracks, and a ram member including catch devices intermittently operable and engageable with one of the said sections in a manner whereby the tread is moved along the tracks and to the propeller members.

5. A tractor tread dismantling machine of the type adaptable for use with tread made of several sections having parallel rods therein and which sections are connected together by links mounted on the ends of adjacent rods of contiguous sections, comprising in combination, a table member having a top portion, propeller members including means for disconnecting the sections of the tread mounted on the table member, and a reciprocating means intermittently moving the tread across the said top portion to the propeller members mounted on the table member.

6. A tractor tread dismantling machine of the type adaptable for use with tread made of several sections having parallel rods therein and which sections are connected together by links mounted on the ends of adjacent rods of contiguous sections, comprising in combination, a support member having a top portion thereon, a longitudinally operating pneumatic ram member mounted on the support member and capable of intermittently moving the aforesaid tread on the said top portion, laterally operating ram members mounted on the support member, and perpendicularly operating ram members mounted on the support member, the said laterally and perpendicularly operating ram members having means thereon for disconnecting sections of the aforesaid tread.

7. A tractor tread dismantling machine of the type adaptable for use with tread made of several sections having parallel rods therein and which sections are connected together by links mounted on the ends of adjacent rods of contiguous sections, comprising in combination, a table member having laterally movable top portions thereon, longitudinally extending stationary tracks mounted on the table member between the said movable top portions, a reciprocating means capable of intermittently moving connected sections of the aforesaid tread along the said stationary tracks, and ram members including means for disconnecting the said sections mounted on the said laterally movable top portions.

8. A tractor tread dismantling machine of the type adaptable for use with tread made of several sections having parallel rods therein and which sections are connected together by links mounted on the ends of adjacent rods of contiguous sections, comprising in combination, a support member, laterally movable top portions including pressure actuated moving means therefor mounted on the support member, longitudinally extending stationary tracks having connected tread sections thereon mounted on the support member between the laterally movable top portions, laterally movable and perpendicularly operable ram members mounted on the said laterally movable top portions and engageable with the connecting links on the said tread sections, and laterally operable ram members mounted on the movable top portions and being capable of moving the perpendicularly operable ram members while in engagement with the links in a manner whereby the said sections are disconnected.

9. A tractor tread dismantling machine of the type adaptable for use with tread made of several sections having parallel rods therein and which sections are connected together by links mounted on the ends of adjacent rods of contiguous sections, comprising in combination, a table member having laterally movable top portions thereon, guides having movable tread thereon mounted on the table member between the said movable top portions, and ram members including means for disconnecting sections of the said tread mounted on the said laterally movable top portions.

10. A tractor tread dismantling machine of the type adaptable for use with tread made of several sections having parallel rods therein and which sections are connected together by links mounted on the ends of adjacent rods of contiguous sections, comprising in combination, a support member, laterally movable top portions including moving means therefor mounted on the support member, longitudinally extending stationary tracks mounted on the support member between the laterally movable top portions, reciprocating means mounted on the support member capable of moving the aforesaid tread sections along said tracks, laterally movable and perpendicularly operable ram members mounted on the said laterally movable top portions and engageable with the connecting links on the said tread sections and laterally operable ram members mounted on the movable top portions and being capable of moving the perpendicularly operable ram members while in engagement with the links in a manner whereby the said sections are disconnected.

11. In a device of the character described, a tread section disconnector, comprising in combination, a support member, a fixed holding member mounted on the support member and being capable of retaining certain sections of tread, press members having means thereon for temporarily engaging the connecting links of the tread between the said sections, and operating means mounted on the support member and connected to the press members and being capable of moving the same in a manner whereby the sections and links are separated and disconnected.

12. A tractor tread dismantling machine of the type adaptable for use with tread made of several sections having parallel rods therein and which sections are connected together by connecting links mounted on the ends of adjacent rods of contiguous sections, in combination, sliding members mounted on the support member and having back-up pins thereon engageable with the rods of contiguous tread sections, jaw-like portions mounted on the sliding members and capable of transferring the connecting links of the said sections on to the said back-up pins, and fixed stripping means mounted on the support member engageable with the connecting links and capable of removing the same from the back-up pins.

13. A tractor tread dismantling machine of the type adaptable for use with tread made of several sections having parallel rods therein and which sections are connected together by connecting links mounted on the ends of adjacent rods of contiguous sections, in combination, a support member, means on the said support member for feeding and positioning thereon sections of the tractor tread, sliding members having back-up pins thereon engageable with the rods of the said sections, jaw-like portions mounted on the sliding members and capable of transferring the connecting links of the said sections on to the said back-up pins, and a fixed stripping means mounted on the support member engageable with the connecting links and capable of removing the same from the back-up pins.

14. A tractor tread dismantling machine of the type adaptable for use with tread made of several sections having parallel rods therein and which sections are connected together by connecting links mounted on the ends of adjacent rods of contiguous sections, in combination, a support member, means on the said support member for feeding and positioning thereon sections of the tractor tread, sliding members having back-up pins thereon aligned with and engageable with the rods of the said sections, movable members including jaw-like portions mounted on the sliding member engageable with and capable of transferring the connecting links of the said sections from the said rods on to the said back-up pins, pressure actuated means mounted on the sliding members for coupling and uncoupling the jaw-like portions and the said connecting links, and a fixed stripping means mounted on the support member engageable with the connecting links and capable of removing the same from the back-up pins.

15. A tractor tread dismantling machine of the type adaptable for use with tread made of several sections having parallel rods therein and which sections are connected together by connecting links mounted on the ends of adjacent rods of contiguous sections, in combination, a support member, means on the said support member for feeding and positioning thereon sections of the tractor tread, sliding members having back-up pins thereon engageable with the rods of the said sections when in a closed position and disengageable therefrom when in an open position, movable members including jaw-like portions mounted on the sliding members, the said movable members being movable to outward or to inward positions and also being engageable with and capable of transferring the connecting links of the said sections from the said rods on to the said back-up pins when the sliding members are in the closed position and when they are in the inward position, pressure actuated means mounted on the movable members capable of coupling the jaw-like portions and the said connecting links when the sliding and movable members are in their respective closed and inward positions and capable of uncoupling the same when the said members are in their respective open and outward positions, and a fixed stripping means mounted on the support member engageable with the connecting links and capable of removing the same from the back-up pins when the said jaw-like portions and connecting links are uncoupled and the said members are in their respective open and outward positions.

PERCY W. MATTHEWS.